(12) United States Patent
Davis

(10) Patent No.: US 9,643,463 B2
(45) Date of Patent: May 9, 2017

(54) RAIL GEAR

(71) Applicant: Diversified Metal Fabricators, Inc., Atlanta, GA (US)

(72) Inventor: Douglas S. Davis, Atlanta, GA (US)

(73) Assignee: Diversified Metal Fabricators, Inc., Atlanta, GA (US)

( * ) Notice: Subject to any disclaimer, the term of this patent is extended or adjusted under 35 U.S.C. 154(b) by 405 days.

(21) Appl. No.: 13/835,977

(22) Filed: Mar. 15, 2013

(65) Prior Publication Data

US 2014/0261067 A1  Sep. 18, 2014

(51) Int. Cl.
*B60F 1/00* (2006.01)

(52) U.S. Cl.
CPC ........... *B60F 1/00* (2013.01); *Y10T 29/49465* (2015.01)

(58) Field of Classification Search
CPC .. B60F 1/043; B60F 1/046; B60F 1/00; B60F 1/04; B60F 2301/02
USPC .................................. 105/72.2, 215.1, 215.2
See application file for complete search history.

(56) References Cited

U.S. PATENT DOCUMENTS

| | | | | |
|---|---|---|---|---|
| 2,013,885 | A * | 9/1935 | Kasper | ............................ 295/39 |
| 2,079,525 | A * | 5/1937 | Place | ........................... 246/34 R |
| 2,981,209 | A * | 4/1961 | Flemming | ........................ 410/53 |
| 4,583,465 | A * | 4/1986 | Powell, Sr. | ................. 105/215.2 |
| 4,787,318 | A * | 11/1988 | Vogel | ........................ B61F 3/04 |
| | | | | 105/136 |
| 6,298,792 | B1 * | 10/2001 | Jackson, Jr. | ............... 105/215.1 |

* cited by examiner

*Primary Examiner* — Mark Le
(74) *Attorney, Agent, or Firm* — Thomas | Horstemeyer, LLP

(57) ABSTRACT

Rail gear may facilitate a vehicle traversing on the rails of a railway. The rail gear may comprise a first rail guidewheel and a second rail guidewheel in rotatable connection with an axle. The rail gear may also comprise a first mount that is restricted from rotating with respect to the axle and a second mount that is configured to rotate with respect to the axle.

17 Claims, 5 Drawing Sheets

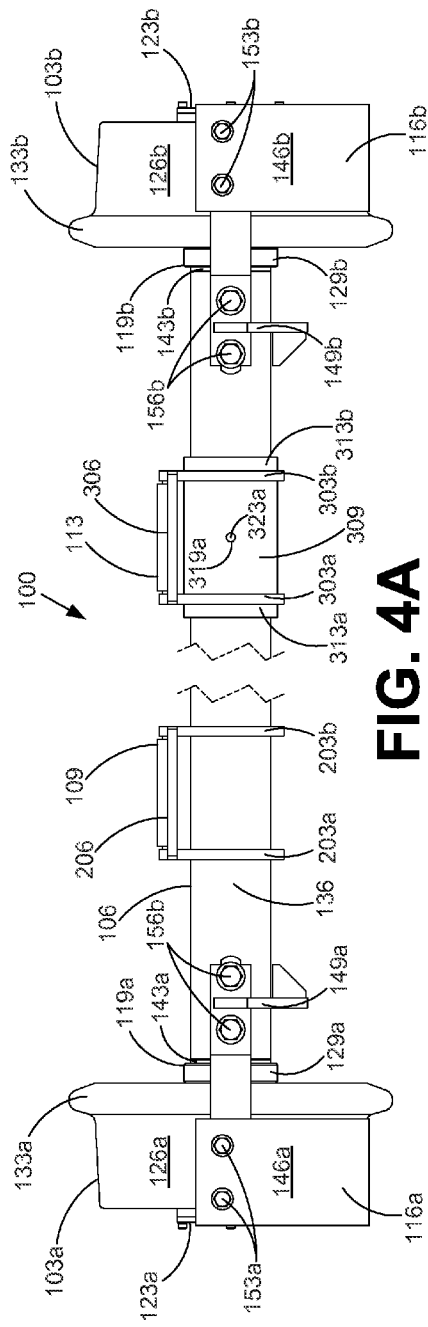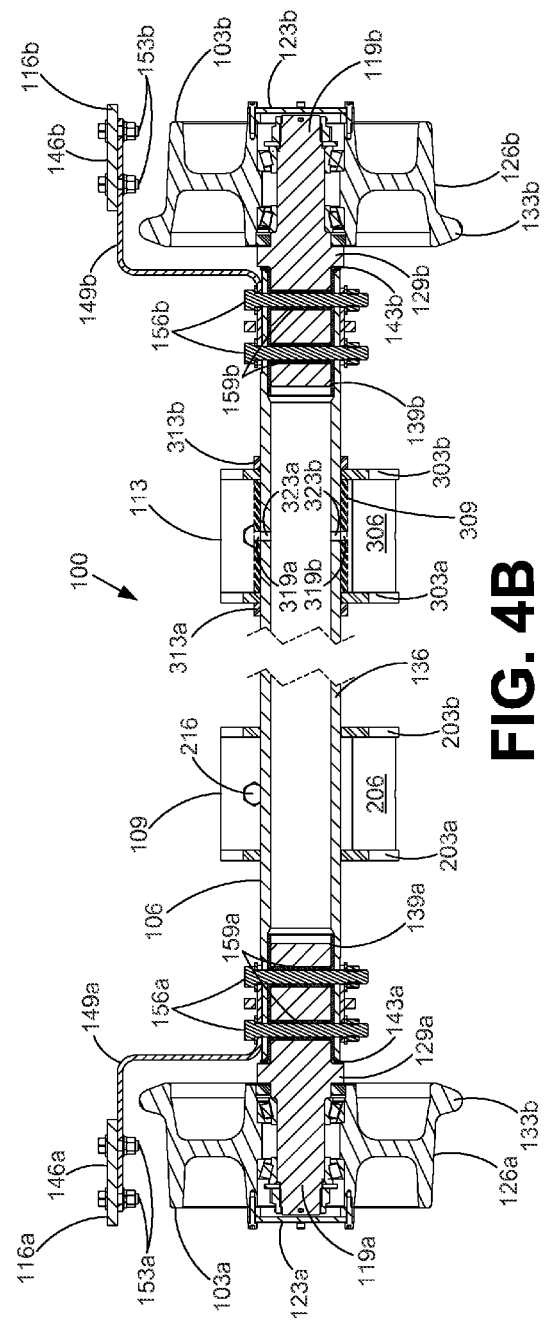

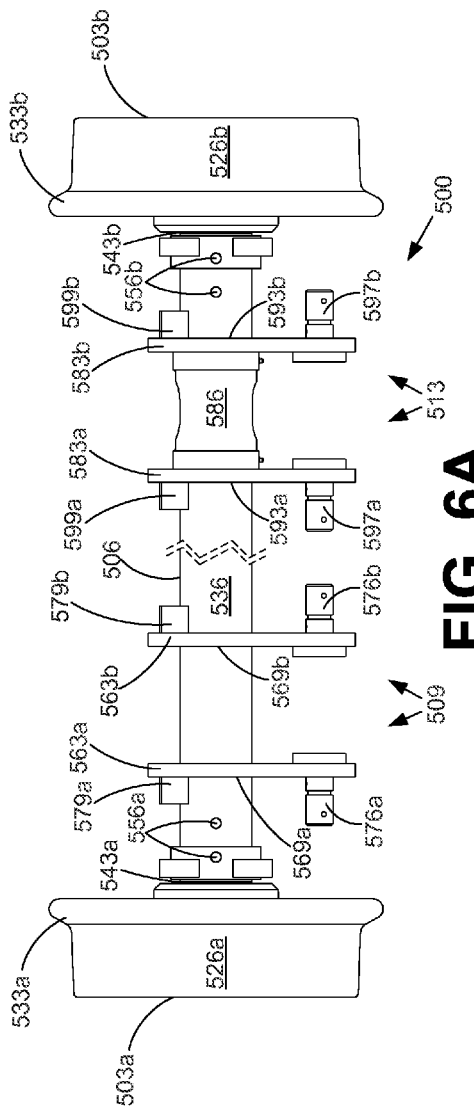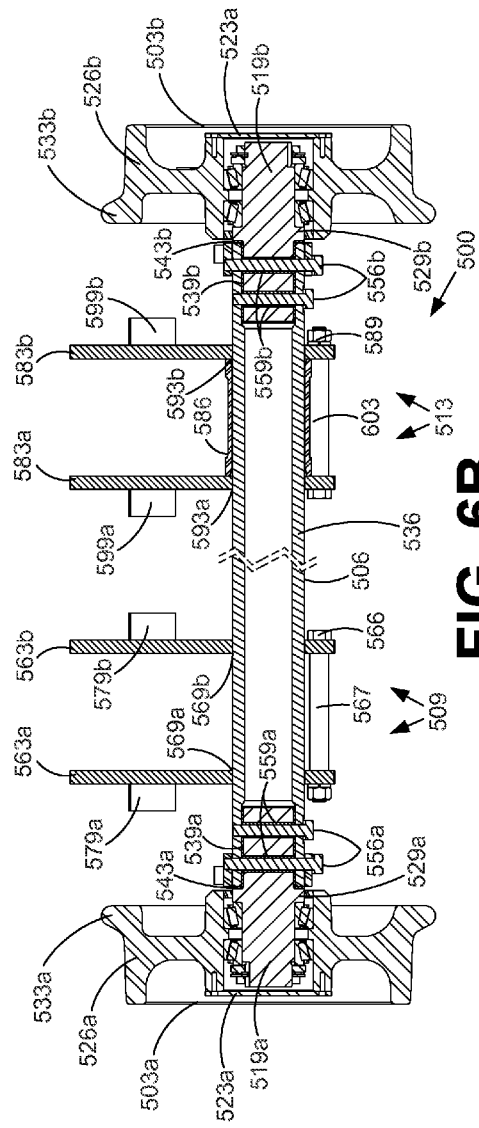

RAIL GEAR

BACKGROUND

A railway typically has a pair of rails on which the wheels of a rail vehicle, such as a train, may ride. It may be desirable for other types of vehicles, such as trucks, to travel on the railway. To this end, these other types of vehicles may be equipped with rail gear that facilitates traveling along the railway.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 4A-4B are additional drawings of the first example of the rail gear of FIG. 1 according to various embodiments of the present disclosure.

FIGS. 6A-6B are additional drawings of the second example of the rail gear of FIG. 5 according to various embodiments of the present disclosure.

DETAILED DESCRIPTION

The present disclosure is directed towards facilitating a vehicle traveling along a railway. For example, it may be desirable for a road vehicle, such as a pickup truck, to travel along a railway for various reasons. The road vehicle may employ rubber tires that are designed to travel on roads or other substantially flat surfaces, but damage to the rubber tires, the vehicle, or the railway may occur if the vehicle drives along the railway without the assistance of rail gear.

In accordance with a non-limiting example of the present disclosure, the road vehicle may be equipped with rail gear that facilitates the road vehicle traveling on the railway. The rail gear may include a pair of rail guidewheels that roll along the rails of the railway and that are rotatably connected to an axle. Additionally, mounts, for example axle brackets, may be provided on the axle of the rail gear and may serve as connection points between the road vehicle and the rail gear.

In an aspect, at least two mounts may be provided to connect the rail gear to the vehicle. At least one mount may be provided about the axle such that the mount and axle may rotate one with respect to the other. The mount may, thus, rotatably secure the axle to a vehicle when the mount is secured to a vehicle, allowing the axle to rotate with respect to the vehicle. As the road vehicle and the rail gear traverse along a curved length of a railway, for example, the mount that is rotatably provided about the axle allows the axle to rotate with respect to the mount and thus also with respect to the vehicle. Allowing rotation of the axle with respect to the mount may facilitate the rail guidewheels of the rail gear maintaining better contact with the rails of the railway while, for example, the rail gear and the road vehicle traverse the curve. As a result, it may be more likely that the rail gear traverses the curve without disengaging the railway.

In various aspects a first mount and a second mount may be provided. A first mount may be provided that is fixedly secured to the axle such that the mount and axle cannot rotate one with respect to the other. A second mount may be provided about the axle such that the second mount and the axle may rotate one with respect to the other. In various aspects two or more mounts, for example, a first mount and a second mount, may be provided about the axle such that both mounts may rotate one with respect to the other.

In the following discussion, a general description of the system and its components is provided, followed by a discussion of the operation of the same.

Figure 1:
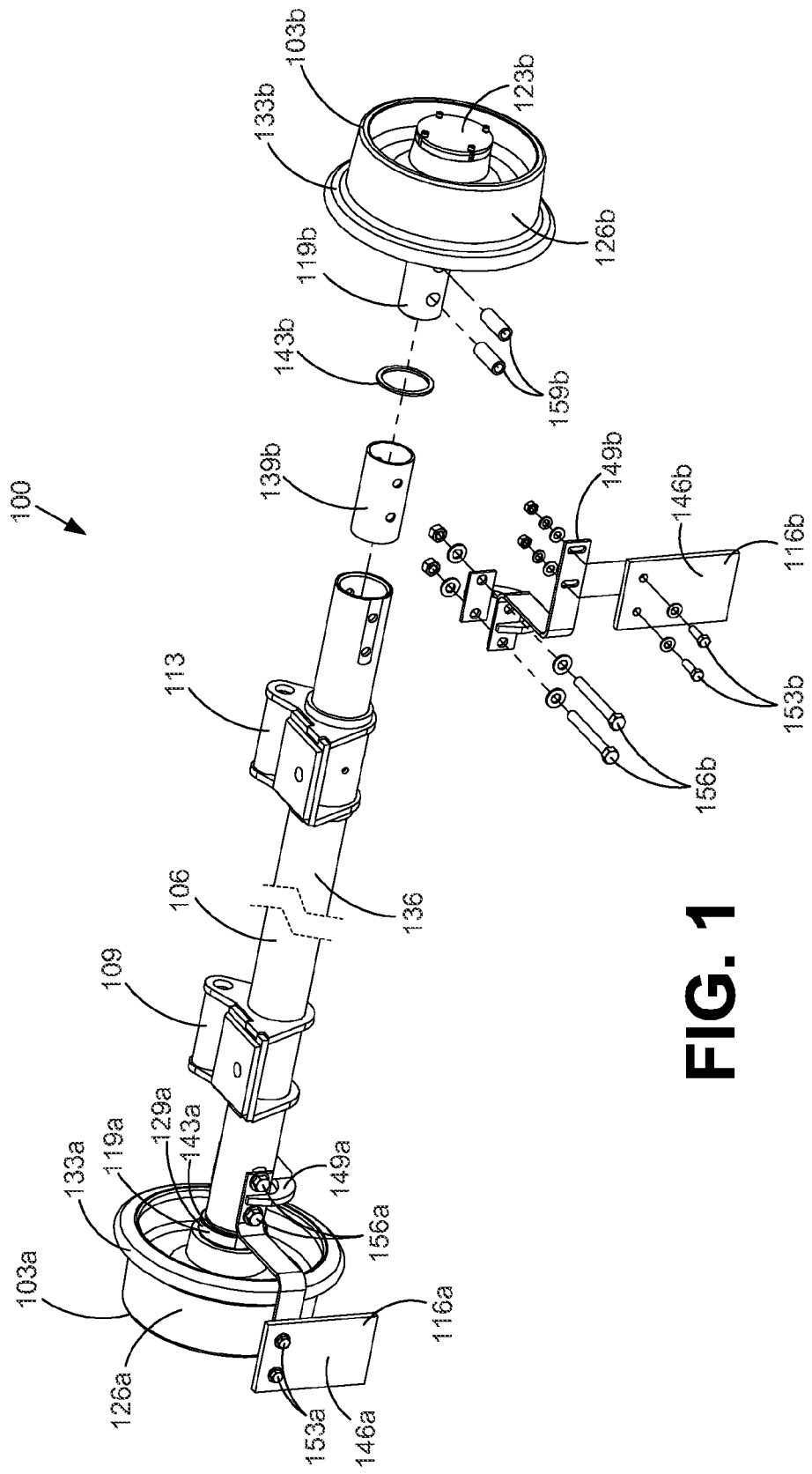
FIG. 1 is a drawing of a first example of rail gear according to various embodiments of the present disclosure.

With reference to FIG. 1, shown is a partially-exploded view of an example of rail gear 100 according to various embodiments of the present disclosure. The rail gear 100 may be configured to attach to a vehicle (not shown) in order to facilitate the vehicle traveling along the rails of a railway. Such a vehicle may comprise rubber tires or tracks that are configured to roll along a relatively flat surface, such as a road, farmland, a construction area, or any other type of terrain that is not the rails of a railway. Such a vehicle may be embodied in the form of, for example but not limited to, a truck, a car, a van, a bus, a tractor, a trailer, a backhoe, a bulldozer, a crawler, or any other type of machinery that may be attached to the rail gear 100 to facilitate the machinery traveling along the railway. According to various embodiments, the rail gear 100 may attach to a vehicle such that, for example, the rail gear 100 is in front of the front wheels of the vehicle or behind the rear wheels of the vehicle. In alternative embodiments, the rail gear 100 may attach to a vehicle such that the rail gear 100 is located under the vehicle between the front wheels and the rear wheels.

The rail gear 100 in the embodiment of FIG. 1 includes rail guidewheel assemblies 103a-103b, an axle 106, a first mount 109, a second mount 113, rail sweep assemblies 116a-116b, and potentially other components. The rail guidewheel assemblies 103a-103b are configured to make contact with and ride along the rails of a railway. As such, the rail guidewheel assembly 103a according to various embodiments may include a wheel shaft or spindle head 119a, a hub cap 123a (FIGS. 4A-4B), a rail guidewheel 126a, and potentially other components. Similarly, the rail guidewheel assembly 103b may include a wheel shaft or spindle head 119b, a hub cap 123b, a rail guidewheel 126b, and potentially other components.

Mounts 109 and 113 are sometimes also referred to as axle brackets. At least one of the mounts is provided or positioned about axle 106 such that the mount and the axle may rotate one with respect to the other, as described in more detail below, for example with respect to FIG. 3. In an aspect both mounts 109 and 113 may be provided about axle 106 allowing rotation of the mount with respect to the axle. In a preferred embodiment, however, one of the mounts may be fixed to or secured to axle 106. A non-limiting example of a possible fixed mount is shown with respect to mount 109 and in more detail with respect to FIG. 2 discussed in more detail below.

The wheel shaft 119a in the present embodiment includes a wheel guide 129a that abuts the interior wall of the rail guidewheel 126a and an end of the axle 106. Similarly, the wheel shaft 119b includes a wheel guide 129b (FIGS. 4A-4B) that abuts the interior wall of the rail guidewheel 126b and the other end of the axle 106. The hub caps 123a-123b are configured to abut and mount to the exterior wall of the respective rail guidewheels 126a-126b. The rail guidewheels 126a-126b are restricted by conventional connection on wheel shafts 119a-119b between the respective wheel guides 129a-129b on the wheel shafts 119a-119b and the respective distal ends of the wheel shafts 119a-119b. In this position, the rail guidewheels 126a-126b may rotate about the wheel shafts 119a-119b as the rail gear 100 traverses along a railway.

Additionally, the rail guidewheels 126a-126b may include flanged rims 133a-133b that are configured to abut the inner sides of the rails of a railway. Because the flanged rims 133a-133b may abut the inner sides of the rails of a railway, the rail guidewheels 126a-126b may be prevented from inadvertently riding off of the rails as the rail gear 100 traverses along a railway. According to various embodiments, the rail guidewheels 126a-126b may include treaded or non-treaded rubber along the portions of the rail guidewheels 126a-126b that roll on the rails of the railway.

The axle 106 in the present embodiment includes an axle shaft 136, insulator tubes 139a (FIG. 4B) and 139b, insulator rings 143a-143b, and potentially other components. The axle shaft 136 provides a connection mechanism by way of wheel shafts 119a-119b between the rail guidewheel assemblies 103a-103b. The axle shaft 136 may also support a vehicle that is attached to the rail gear 100. In the embodiment of FIG. 1, the axle shaft 136 is embodied as a hollow tube.

The insulator tubes 139a-139b may provide electrical insulation between the axle 106 and the rail guidewheel assemblies 103a-103b so that the rail gear 100 may be prevented from unintentionally triggering signaling circuitry for a railway. To this end, the insulator tubes 139a-139b may comprise materials such as, for example, rubber, plastic, or any other suitable material. In the embodiment of FIG. 1, the outer diameters of the insulator tubes 139a-139b are less than the inner diameter of the axle shaft 136 so that the insulator tubes 139a-139b may insert into the axle shaft 136. Additionally, the insulator tubes 139a-139b in the embodiment of FIG. 1 have inner diameters that are greater than the outer diameters of the wheel shafts 119a-119b for the rail guidewheel assemblies 103a-103b so that the wheel shafts 119a-119b may insert into the respective insulator tubes 139a-139b.

The insulator rings 143a-143b may also provide electrical insulation between the axle 106 and the rail guidewheel assemblies 103a-103b so that the rail gear 100 may be prevented from unintentionally triggering signaling circuitry for a railway as the rail gear 100 traverses along the railway. To this end, the insulator rings 143a-143b may comprise materials such as, for example, rubber, plastic, or any other suitable type of material. When the rail gear 100 is assembled, the insulator rings 143a-143b are restricted between the respective ends of the axle shaft 136 and the respective wheel guides 129a-129b on the wheel shafts 119a-119b. In these positions, the insulator rings 143a-143b may resist electrical current from flowing between the ends of the axle shaft 136 and the wheel guides 129a-129b.

Figure 5:
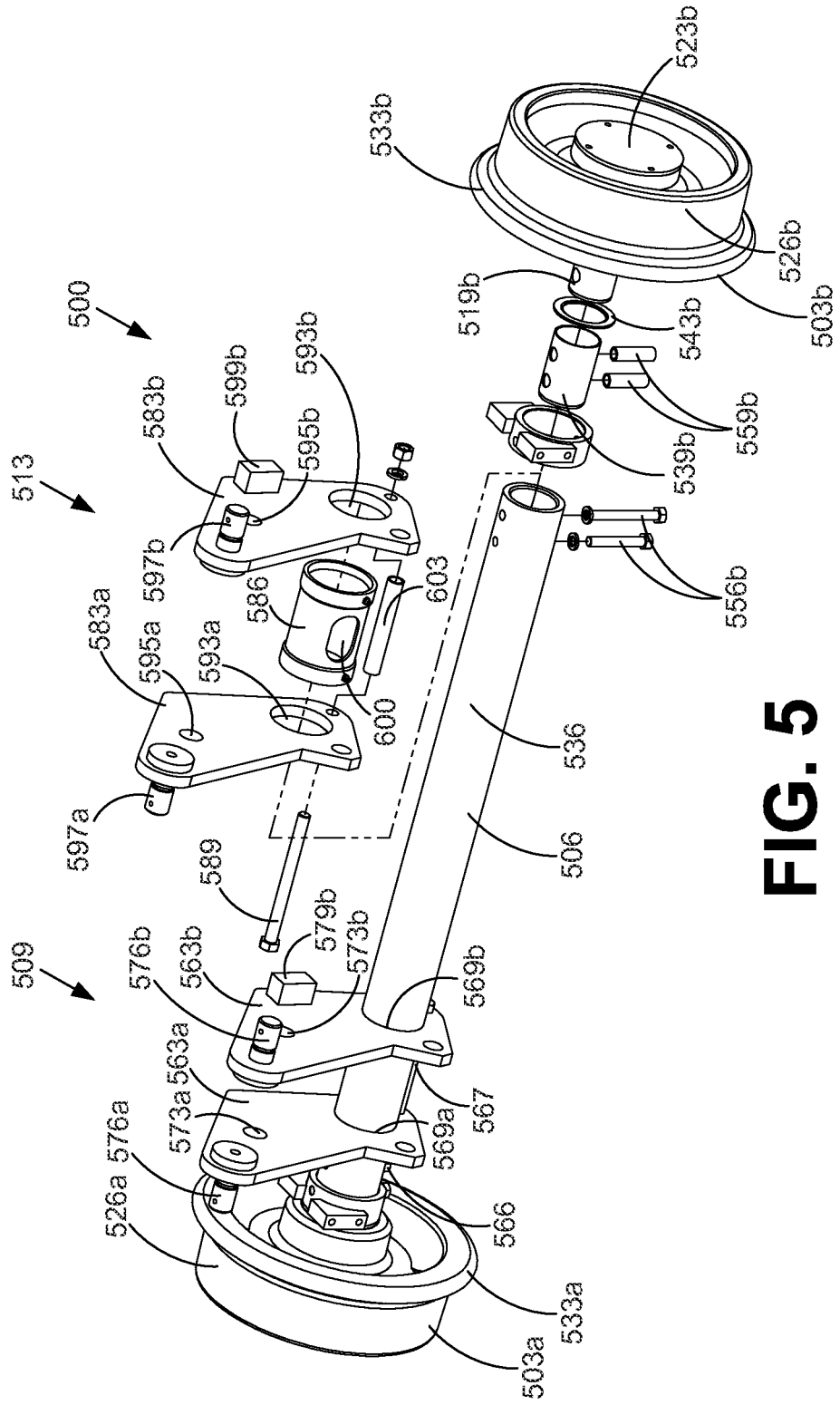
FIG. 5 is a drawing of a second example of rail gear according to various embodiments of the present disclosure.

As the rail gear 100 traverses along the railway, the rail sweeps 116a-116b may displace debris or other matter that is located on the rails of the railway. As seen in FIG. 5 with respect to another aspect, rail sweep assemblies 116a-116b may be optional. According to various embodiments, the rail sweep assemblies 116a-116b may include respective guards or sweeps 146a-146b, guard mounting brackets 149a-149b, guard attachment hardware 153a-153b, and potentially other components. The guards 146a-146b may comprise, for example, rubber or any other type of material that is suitable for displacing debris or other types of matter from the rails of a railway. The guard mounting brackets 149a-149b serve to mount and position the guards 146a-146b so that the guards 146a-146b may be aligned with the respective rail guidewheels 126a-126b. In this position, the guards 146a-146b may displace debris or other matter from the rails of a railway to prevent interference with the rail guidewheels 126a-126b.

Various embodiments of the present disclosure may also include mounting hardware 156a-156b that facilitates attachment of the rail guidewheel assemblies 103a-103b and the rail sweep assemblies 116a-116b to the axle 106. In the embodiment of FIG. 1, the mounting hardware 156a-156b includes bolts, washers, nuts, and potentially other components. Additionally, various embodiments may include insulator sleeves 159a-159b. The insulator sleeves 159a-159b may electrically insulate the axle 106 from the rail guidewheel assemblies 103a-103b. To this end, the insulator sleeves 159a-159b may comprise materials such as, for example, rubber, plastic, or any other suitable material. The insulator sleeves 159a-159b may have an outer diameter that is smaller than the diameter of holes located in the wheel shafts 119a-119b of the rail guidewheel assemblies 103a-103b so that the insulator sleeves 159a-159b may insert into the holes in the wheel shafts 119a-119b. The insulator sleeves 159a-159b may also have inner diameters that are greater than the diameters of the bolts for the mounting hardware 156a-156b so that the bolts may insert into the respective insulator sleeves 159a-159b.

For the embodiment shown in FIG. 1, the bolts of the mounting hardware 156a-156b insert into respective holes in the guard mounting brackets 149a-149b, into respective holes in the axle shaft 136, into respective holes in the insulator tubes 139a-139b, into respective holes in the insulator sleeves 159a-159b, and into respective holes in the wheel shafts 119a-119b. When the bolts are fastened, using nuts or threaded holes for example, the axle 106, the rail sweeps 116a-116b, and the wheel shafts 119a-119b may be restricted to positions that are fixed with respect to each other. Because the rail guidewheels 126a-126b may rotate about the respective wheel shafts 119a-119b, the rail guidewheels 126a-126b may also rotate with respect to the wheel shafts 119a-119b and axle 106.

Additionally, because the insulator sleeves 159a-159b are electrical insulators, the insulator sleeves 159a-159b may resist electrical current from flowing between the wheel shafts 119a-119b, the axle 106, and/or the mounting hardware 156a-156b. As a result, the rail gear 100 may be prevented from unintentionally triggering signaling circuitry for a railway when the rail gear 100 traverses along the railway.

Figure 2:
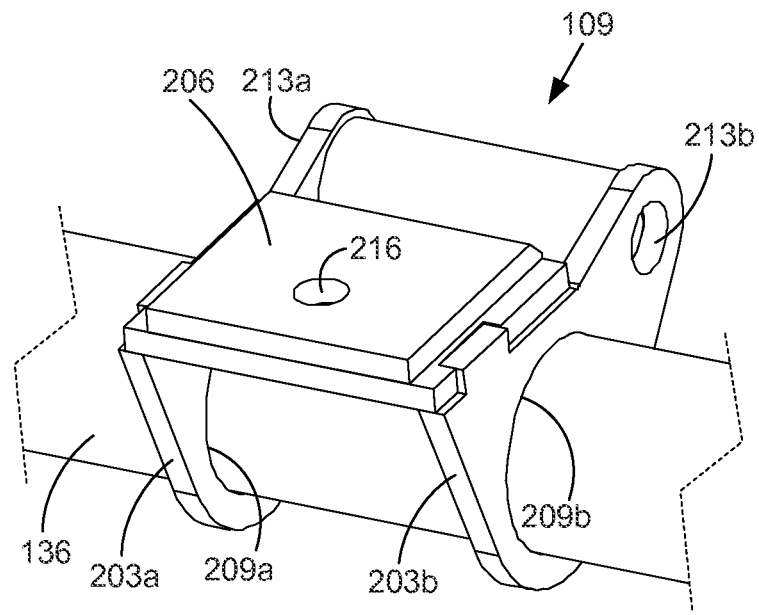
FIG. 2 is a drawing of an example of a fixed mount for the first example of the rail gear of FIG. 1 according to various embodiments of the present disclosure.

With reference to FIG. 2, shown is a drawing of an example of a fixed mount 109 according to various embodiments of the present disclosure. In particular, shown is a fixed mount 109 attached to the axle shaft 136. The fixed mount 109 may also attach directly to, for example, the frame or chassis of a vehicle (not shown). Alternatively, the fixed mount 109 may attach to a lift, mounting bracket, bracket assembly, or other type of mechanism that is in attachment with a vehicle. Such a lift may lower and raise the rail gear 100 (FIG. 1) with respect to the vehicle so that the vehicle may, for example, be driven on a road without the rail gear 100 making unintentional contact with the road.

When the vehicle is to be driven along a railway, the lift may lower the rail gear 100 so that it engages the rails of the railway.

The fixed mount 109 according to various embodiments may include one or more fixed arms 203a-203b, a mount platform 206, and potentially other components. The fixed arms 203a-203b may include respective axle holes 209a-209b and respective mount holes 213a-213b. The axle holes 209a-209b may have diameters that are approximately the same diameter as the axle shaft 136 so that the fixed arms 203a-203b may slide longitudinally along the axle shaft 136 into the position shown in FIG. 1 during assembly of the rail gear 100. A pin, bolt, or other type of fastener may insert into the mount holes 213a-213b to facilitate attaching the fixed mount 109 to the vehicle or to another apparatus that is attached to the vehicle, such as a lift or mounting bracket.

The mount platform 206 may also provide an attachment point between the fixed mount 109 and a vehicle or to another apparatus that is attached to the vehicle, such as a lift or mounting bracket. In the embodiment of FIG. 2, the mount platform 206 includes a hole 216 through which a fastener, such as a bolt, a pin, or any other suitable fastener, may insert to facilitate attaching the fixed mount 109 to the vehicle.

The fixed arms 203a-203b may be secured to the axle shaft 136. In this sense, the fixed arms 203a-203b are restricted from moving or rotating with respect to the axle shaft 136. To this end, the fixed arms 203a-203b may be, for example, welded to the axle shaft 136 or attached by any other suitable method. Because the fixed arms 203a-203b are fixedly attached to the axle shaft 136, the fixed mount 109 is restricted from rotating about the axle shaft 136.

Figure 3:
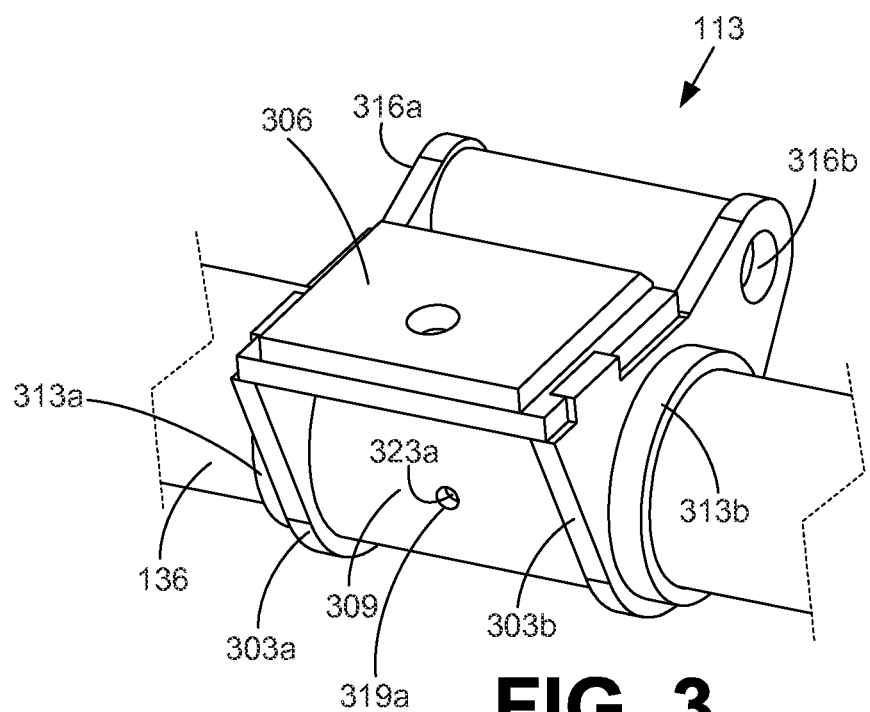
FIG. 3 is a drawing of an example of a rotatable mount for the first example of the rail gear of FIG. 1 according to various embodiments of the present disclosure.

With reference to FIG. 3, shown is a drawing of an example of a rotatable mount 113 according to various embodiments of the present disclosure. In particular, shown is the rotatable mount 113 provided about the axle shaft 136. Similar to the fixed mount 109 (FIG. 2), the rotatable mount 113 may attach directly to, for example, the chassis of a vehicle. Alternatively, the rotatable mount 113 may attach to a lift, mounting bracket, or other type of mechanism that is in attachment with a vehicle.

The rotatable mount 113 according to various embodiments may include rotatable arms 303a-303b, a mount platform 306, an axle sleeve 309, and potentially other components. The axle shaft 136 may also include one or more collars 313a-313b. The mount platform 306 may be similar to the mount platform 206 (FIG. 2) and may also provide an attachment point between the rotatable mount 113 and a vehicle or another apparatus that is attached to the vehicle, such as a lift or mounting bracket. In the present embodiment, the mount platform 306 includes a hole 216 through which a fastener, such as a bolt, a pin, or any other suitable fastener, may insert to facilitate attaching the rotatable mount 113 to the vehicle.

The rotatable arms 303a-303b according to various embodiments may have some features that are similar to the fixed arms 203a-203b (FIG. 2) for the fixed mount 109 (FIG. 2). For example, the rotatable arms 303a-303b in the present embodiment may include axle holes (not visible) that may receive the axle shaft 136. The rotatable arms 303a-303b may also include mount holes 316a-316b that may receive a fastener, such as a bolt, a pin, or other suitable type of fastener, to facilitate connection between the rotatable mount 113 and a vehicle.

Unlike the fixed arms 203a-203b of the fixed mount 109, the rotatable arms 303a-303b are configured to allow rotation with respect to the axle shaft 136. In particular, the rotatable arms 303a-303b in the embodiment of FIG. 3 are configured to allow the arms 303a-303b and thus mount 113 to rotate with respect to the axle shaft 136. Thus the rotatable mount 113 may rotate with respect to the axle shaft 136 about an axis defined by the longitudinal length of the axle shaft 136. As such, the rotatable mount 113 in the embodiment of FIG. 3 is configured to rotate about an axis defined by the longitudinal length of the axle shaft 136.

The axle sleeve 309 according to various embodiments may be embodied as a hollow tube with an inner diameter that is greater than the outer diameter of the axle shaft 136. The ends of the axle sleeve 309 may abut the sides of the rotatable arms 303a-303b. Furthermore, the axle sleeve 309 may be restricted from moving with respect to the rotatable arms 303a-303b. To this end, the axle sleeve 309 may be, for example, welded to the rotatable arms 303a-303b or attached to the arms by any other suitable method.

Because the inner diameter of the axle sleeve 309 is greater than the outer diameter of the axle shaft 136, the axle sleeve 309 may rotate with respect to the axle shaft 136. Furthermore, because the ends of the axle sleeve 309 may be restricted from rotating with respect to the rotatable arms 303a-303b, the axle sleeve 309 may rotate in conjunction with the rotatable arms 303a-303b about the axis defined by the longitudinal length of the axle shaft 136.

According to various embodiments, the axle sleeve 309 may include holes 319a-319b (FIGS. 4A-4B), and the axle shaft 136 may include corresponding holes 323a and 323b (FIGS. 4A-4B). When the holes 319a-319b for the axle sleeve 309 are aligned with the holes 323a-323b for the axle shaft 136, a rod, pin, shaft, bolt or other suitable component may be inserted into the holes 319a-319b and the holes 323a-323b to restrict the rotation of the rotatable mount 113 with respect to the axle shaft 136. It may be desirable to restrict the rotation of the rotatable mount 113, for example, during installation of the rail gear 100 on a vehicle, when the rail gear 100 is disengaged from a railway and the vehicle is riding on a road, or in other situations. The rod, pin, shaft, bolt or other type of component that has been inserted into the holes 319a-319b and the holes 323a-323b may be removed when the rail gear 100 is to engage and traverse along a railway.

The collars 313a-313b may restrict movement of the rotatable mount 113 with respect to the axle shaft 136 along the longitudinal length of the axle shaft 136. To this end, the collars 313a-313b in the present embodiment comprise rings that have inner diameters that are greater than the outer diameter of the axle shaft 136. The collars 313a-313b may be secured to the axle shaft 136. In this sense, the collars 313a-313b are restricted from moving or rotating with respect to the axle shaft 136 by welding the mount guides 313a-313b to the axle shaft 136 or by using any other suitable method. Because the collars 313a-313b are fixedly attached to the axle shaft 136, the rotatable arms 303a-303b may be restricted between the mount guides 313a-313b while being able to rotate about the axle shaft 136.

With reference to FIGS. 4A-4B, shown are additional drawings of the rail gear 100 according to various embodiments of the present disclosure. In particular, FIG. 4A is a front-view drawing of the rail gear 100, and FIG. 4B is a bottom-view cross-section of the rail gear 100. As shown, ends of the wheel shafts 119a-119b have been inserted into the axle shaft 136. The mounting hardware 156a-156b have also been inserted into corresponding holes in the axle shaft 136 and the wheel shafts 119a-119b. As a result, the axle shaft 136 and the wheel shafts 119a-119b are fixed in position with respect to each other, and the rail guidewheels 126a-126b may rotate about the respective wheel shafts 119a-119b.

The insulator rings 143a-143b are positioned between the respective wheel stops 129a-129b and the ends of the axle shaft 136. Thus, the insulator rings 143a-143b may restrict electrical current from flowing between the wheel shafts 119a-119b and the axle shaft 136. Additionally, the insulator tubes 139a-139b are positioned between the outer surface of the wheel shafts 119a-119b and the interior of the axle shaft 136. As a result, the insulator tubes 139a-139b may restrict electrical current from flowing between the wheel shafts 119a-119b and the axle shaft 136. Additionally, the insulator sleeves 159a-159b are positioned between the wheel shafts 119a-119b and the bolts of the mounting hardware 156a-156b. In this position, the insulator sleeves 159a-159b may restrict electrical current from flowing between the wheel shafts 119a-119b and the mounting hardware 156a-156b. Thus, the insulator rings 143a-143b, the insulator tubes 139a-139b, and the insulator sleeves 159a-159b may resist electrical current from flowing between the rail guidewheel assemblies 103a-103b and the axle 106. As a result, the rail gear 100 may be prevented from unintentionally triggering railway signaling circuitry when the rail gear 100 traverses along a railway.

As shown in FIGS. 4A-4B, the axle sleeve 309 of mount 113 is positioned over the axle shaft 136 and is free to rotate about the axle shaft 136. Similarly, the rotatable arms 303a-303b of mount 113, which may be fixedly attached to the axle sleeve 309 in various embodiments, are free to rotate about the axle shaft 136. Because the mount platform 306 in the present embodiment is attached to the rotatable arms 303a-303b, the mount platform 306 may rotate with respect to the axle 106. Because the collars 313a-313b are fixedly attached to the axle shaft 136 outside of each side of the rotatable mount 113, the rotatable mount 113 is restricted from moving along the longitudinal length of the axle shaft 136. Thus, the rotatable mount 113 may be free to rotate about the axle shaft 136, and the position of the rotatable mount 113 along the longitudinal length of the axle shaft 136 may be restricted.

The rail gear 100 may be attached to a vehicle via the fixed mount 109 and the rotatable mount 113. For example, the fixed mount 109 and the rotatable mount 113 may be attached directly to the frame or chassis of the vehicle. Alternatively, the fixed mount 109 and the rotatable mount 113 may be directly attached to a rail gear lift, mounting bracket, or other type of apparatus that facilitates attaching the rail gear 100 to a vehicle.

With the rail gear 100 attached to a vehicle, the rail gear 100 may be engaged with the rails of a railway, and the vehicle may traverse along the railway with the aid of the rail gear 100. In this sense, the rail guidewheels 126a-126b may make contact with and roll along the rails of the railway by rotating about the wheel shafts 119a-119b. If the rail gear 100 traverses along a curved length of the railway, for example, the rotatable mount 113 may rotate with respect to the axle 106 so that the axle 106 may rotate with respect to the attachment point between the vehicle and the rail gear 100. As a result, it may be more likely that the rail gear 100 traverses along the curved length of the railway without the rail guidewheels 126a-126b disengaging the rails of the railway.

With reference to FIG. 5, shown is a partially-exploded view of another example of rail gear 100, now referred to as the rail gear 500, according to various embodiments of the present disclosure. The rail gear 500 may be configured to attach to a vehicle (not shown) in order to facilitate the vehicle traveling along the rails of a railway.

The rail gear 500 according to various embodiments may include rail guidewheel assemblies 503a-503b, an axle 506, a first mount 509, a second mount 513, and potentially other components. The rail guidewheel assemblies 503a-503b are configured to make contact with and ride along the rails of a railway. As such, the rail guidewheel assembly 503a may include a wheel shaft or spindle head 519a (FIG. 6B), a hub cap 523a (FIG. 6B), a rail guidewheel 526a, and potentially other components. Similarly, the rail guidewheel assembly 503b may include a wheel shaft or spindle head 519b, a hub cap 523b, a rail guidewheel 526b, and potentially other components.

Mounts 509 and 513 are sometimes also referred to as axle brackets. At least one of the mounts is provided or positioned about axle 506 such that the mount and the axle may rotate one with respect to the other, as described in more detail below, for example with respect to FIGS. 6A and 6B. In an aspect to both mounts 509 and 513 may be provided about axle 506 allowing rotation of the mount with respect to the axle. In a preferred embodiment, however, one of the mounts may be fixed to or secured to axle 506. A non-limiting example of a possible fixed mount is shown with respect to mount 509 and in more detail with respect to FIGS. 6A and 6B discussed in more detail below.

The wheel shaft 519a in the present embodiment includes a wheel guide 529a (FIG. 6B) that abuts the interior wall of the rail guidewheel 526a and an end of the axle 506. Similarly, the wheel shaft 519b includes a wheel guide 529b (FIG. 6B) that abuts the interior wall of the rail guidewheel 526b and the other end of the axle 506. The hub caps 523a-523b are configured to mount to the exterior wall of the respective rail guidewheels 526a-526b. The rail guidewheels 526a-526b are restricted by conventional connection on wheel shafts 519a-519b between the respective wheel guides 529a-529b on the wheel shafts 519a-519b and the respective distal ends of the wheel shafts 519a-519b, such that the rail guidewheels 526a-526b rotate about the wheel shafts 519a-519b as the rail gear 500 travels along a railway.

Additionally, the rail guidewheels 526a-526b may include flanged rims 533a-533b that are configured to abut the inner sides of the rails of a railway. Because the flanged rims 533a-533b may abut the inner sides of the rails of a railway, the rail guidewheels 526a-526b may be prevented from inadvertently riding off of the rails as the rail gear 500 traverses along a railway. According to various embodiments, the rail guidewheels 526a-526b may include treaded or non-treaded rubber along the portions of the rail guidewheels 526a-526b that roll on the rails of the railway.

The axle 506 in the embodiment of FIG. 5 includes an axle shaft 536, insulator tubes 539a (FIG. 6B) and 539b, insulator rings 543a (FIG. 6B) and 543b, and potentially other components. The axle shaft 536 provides a connection by way of wheel shafts 519a-519b between the rail guidewheel assemblies 503a-503b. The axle shaft 536 may also support a vehicle that is attached to the rail gear 500. In the embodiment shown in FIG. 5, the axle shaft 536 is embodied as a hollow tube.

The insulator tubes 539a-539b may provide electrical insulation between the axle 506 and the rail guidewheel assemblies 503a-503b so that the rail gear 500 may be prevented from unintentionally triggering signaling circuitry for a railway. To this end, the insulator tubes 539a-539b may comprise materials such as, for example, rubber, plastic, or any other suitable material. In the embodiment of FIG. 5, the outer diameters of the insulator tubes 539a-539b are less than the inner diameter of the axle shaft 536 so that the insulator tubes 539a-539b may insert into the axle shaft 536. Additionally, the insulator tubes 539a-539b in the embodiment of FIG. 5 have inner diameters that are greater than the outer diameters of the wheel shafts 519a-519b for the rail guidewheel assemblies 503a-503b so that the wheel shafts 519a-519b may insert into the respective insulator tubes 539a-539b.

The insulator rings 543a-543b may also provide electrical insulation between the axle 506 and the rail guidewheel assemblies 503a-503b so that the rail gear 500 may be prevented from unintentionally triggering signaling circuitry for a railway as the rail gear 500 traverses along the railway. To this end, the insulator rings 543a-543b may comprise materials such as, for example, rubber, plastic, or any other suitable type of material. When the rail gear 500 is assembled, the insulator rings 543a-543b are restricted between the respective ends of the axle shaft 536 and the respective wheel guides 529a-529b on the wheel shafts 519a-519b. In these positions, the insulator rings 543a-543b may resist electrical current from flowing between the ends of the axle shaft 536 and the wheel guides 529a-529b.

Various embodiments of the present disclosure may also include mounting hardware 556a-556b that facilitates attachment of the rail guidewheel assemblies 503a-503b to the axle 506. In the embodiment of the FIG. 5, the mounting hardware 556a-556b includes bolts, washers, and potentially other components. Additionally, various embodiments may include insulator sleeves 559a (FIG. 6B) and 559b. The insulator sleeves 559a-559b may electrically insulate the axle 506 from the rail guidewheel assemblies 503a-503b. To this end, the insulator sleeves 559a-559b may comprise materials such as, for example, rubber, plastic, or any other suitable material. The insulator sleeves 559a-559b may have outer diameters that are smaller than the diameters of holes located in the wheel shafts 519a-519b of the rail guidewheel assemblies 503a-503b so that the insulator sleeves 559a-559b may insert into the holes in the wheel shafts 519a-519b. The insulator sleeves 559a-559b may also have inner diameters that are greater than the diameters of the bolts for the mounting hardware 556a-556b so that the bolts may insert into the respective insulator sleeves 559a-559b.

For the embodiment in FIG. 5, the bolts of the mounting hardware 556a-556b insert into respective holes in the axle shaft 536, into respective holes in the insulator tubes 539a-539b, into respective holes in the insulator sleeves 559a-559b, and into respective holes in the wheel shafts 519a-519b. When the bolts are fastened, using nuts or threaded holes for example, the axle 506 and the wheel shafts 519a-519b may be restricted to be fixed with respect to each other. Because the rail guidewheels 526a-526b may rotate about the respective wheel shafts 519a-519b, the rail guidewheels 526a-526b may also rotate with respect to the wheel shafts 519a-519b and axle 506.

Additionally, because the insulator sleeves 559a-559b are electrical insulators, the insulator sleeves 559a-559b may resist electrical current from flowing between the wheel shafts 519a-519b, the axle 506, and/or the mounting hardware 556a-556b. As a result, the rail gear 500 may be prevented from unintentionally triggering signaling circuitry for a railway when the rail gear 500 traverses along the railway.

The first mount 509 may facilitate attachment between the rail gear 500 and a vehicle. In the embodiment of FIG. 5, the first mount 509 is fixedly attached to the axle shaft 536. In this sense, the fixed mount 509 is restricted from rotation and other types of movement with respect to the axle 506.

The fixed mount 509 may also attach to a frame or chassis of a vehicle. Alternatively, the fixed mount 509 may attach to a lift for the rail gear 500, a mounting bracket, bracket assembly or any other type of apparatus that facilitates attachment of the rail gear 500 to a vehicle.

According to various embodiments, the fixed mount 509 may comprise one or more fixed arms 563a-563b, one or more ties 566, and potentially other components. The fixed arms 563a-563b may provide an attachment point between a vehicle to the rail gear 500. Additionally, the fixed arms 563a-563b may be restricted from movement with respect to the axle shaft 536. To this end, one or more of the fixed arms 563a-563b may be welded to the axle shaft 536 or attached using any other suitable method. In various embodiments, the fixed arm 563a may be welded to the axle shaft 536, and the fixed arm 563b may not be welded to the axle shaft 536. In such embodiments, the tie 566 may restrict the fixed arms 563a-563b from movement with respect to each other. To this end, the tie 566 may be a rod, bolt, shaft, or any other suitable component that is coupled to the fixed arms 563a-563b. The tie 566 may also be associated with a sleeve 567 that is positioned between the fixed arms 563a-563b and into which the tie 566 inserts. In this fashion, the fixed arms 563a-563b may be further restricted from moving with respect to each other.

The fixed arms 563a-563b may include axle holes 569a-569b, mount holes 573a-573b, mounting pins 576a-576b, blocks 579a (FIGS. 6A-6B) and 579b, and potentially other components. The axle holes 569a-569b may have diameters that are approximately the same diameter as the axle shaft 536 so that the fixed arms 563a-563b may slide longitudinally along the length of the axle shaft 536 into the position shown in FIG. 5 during assembly of the rail gear 500. The mount holes 573a-573b, the mounting pins 576a-576b, and/or the blocks 579a-579b may facilitate attaching the fixed mount 509 to a vehicle. For example, the mounting pins 576a-576b may insert into corresponding holes in the chassis of a vehicle, and/or a rod may insert into the mount holes 573a-573b in order to attach the fixed mount 509 to a vehicle. Additionally, the mounting pins 576a-576b may comprise grease fittings to facilitate providing lubrication to the mounting pins 576a-576b.

The second mount 513 may also facilitate attachment between the rail gear 500 and a vehicle. Additionally, the second mount 513 is configured to rotate with respect to the axle 506. More specifically, in the embodiment of FIG. 5, a rotatable mount 513 is configured to rotate about an axis defined by the longitudinal length of the axle shaft 536.

Various embodiments of the rotatable mount 513 may include one or more rotatable arms 583a-583b, one or more axle sleeves 586, one or more ties 589, and potentially other components. The rotatable arms 583a-583b may be configured to rotate with respect to the axle shaft 536. In particular, the rotatable arms 583a-583b in the embodiment of FIG. 5 are configured to rotate about an axis defined by the longitudinal length of the axle shaft 536.

In order to facilitate the rotatable arms 583a-583b being configured to rotate with respect to the axle 506, the rotatable arms 583a-583b in the embodiment of FIG. 5 include respective axle holes 593a-593b that have diameters that are greater than the outer diameter of the axle shaft 536. Because the diameters of the axle holes 593a-593b are greater than the diameter of the axle shaft 536, the rotatable arms 583a-583b, and thus the rotatable mount 513, may be free to rotate about the axle 506.

The rotatable arms 583a-583b according to various embodiments may also include mount holes 595a-595b, mounting pins 597a-597b, blocks 599a (FIGS. 6A-6B) and 599b, and potentially other components. The mount holes 595a-595b, the mounting pins 597a-597b, and/or the blocks 599a-599b may facilitate attaching the rotatable mount 513 to a vehicle. For example, the mounting pins 597a-597b may insert into corresponding holes in the chassis of a vehicle, and/or a rod may insert into the mount holes 595a-595b in order to attach the rotatable mount 513 to a vehicle. Additionally, the mounting pins 597a-597b may comprise grease fittings to facilitate providing lubrication to the mounting pins 597a-597b.

The axle sleeve 586 in the embodiment of FIG. 5 is positioned between the rotatable arms 583a-583b. According to various embodiments, the axle sleeve 586 may be restricted from movement with respect to the axle shaft 536. To this end, the axle sleeve 586 may be, for example, welded to the axle shaft 536 or be fixedly attached using any other suitable method. In the embodiment of FIG. 5, the axle sleeve 586 includes an opening 600 that may facilitate welding the axle sleeve 586 to the axle shaft 536.

The tie 589 may restrict the rotatable arms 583a-583b from movement with respect to each other so that the rotatable arms 583a-583b may rotate together with respect to the axle shaft 536. To this end, the tie 589 may be a rod, a bolt, a shaft, or any other suitable component that is coupled to the rotatable arms 583a-583b. The tie 589 may also restrict the rotatable arms 583a-583b so that they are positioned adjacent to the axle sleeve 586. Additionally, the tie 589 may also be associated with an axle sleeve 603 that is positioned between the rotatable arms 583a-583b and into which the tie 589 inserts.

With reference to FIGS. 6A-6B, shown are additional drawings of the rail gear 500 according to various embodiments of the present disclosure. In particular, FIG. 6A is a top-view of the rail gear 500, and FIG. 6B is a front-view cross-section of the rail gear 500. As shown, ends of the wheel shafts 519a-519b have been inserted into the axle shaft 536. The mounting hardware 556a-556b has also been inserted into corresponding holes in the axle shaft 536 and the wheel shafts 519a-519b. As a result, the axle shaft 536 and the wheel shafts 519a-519b are fixed in position with respect to each other, and the rail guidewheels 526a-526b may rotate about the respective wheel shafts 519a-519b.

The insulator rings 543a-543b are positioned between the wheel shafts 519a-519b and the ends of the axle shaft 536. Thus, the insulator rings may restrict electrical current from flowing between the wheel shafts 519a-519b and the axle shaft 536. Additionally, the insulator tubes 539a-539b are positioned between the outer surface of wheel shafts 519a-519b and the interior of the axle shaft 536. As a result, the insulator tubes 539a-539b may restrict electrical current from flowing between the wheel shafts 519a-519b and the axle shaft 536. Additionally, the insulator sleeves 559a-559b are positioned between the wheel shafts 519a-519b and the bolts of the mounting hardware 556a-556b. In this position, the insulator sleeves 559a-559b may restrict electrical current from flowing between the wheel shafts 519a-519b and the mounting hardware 556a-556b. Thus, the insulator rings 543a-543b, the insulator tubes 539a-539b, and the insulator sleeves 559a-559b may resist electrical current from flowing between the rail guidewheel assemblies 503a-503b and the axle 506. As a result, the rail gear 500 may be prevented from unintentionally triggering railway signaling circuitry when the rail gear 500 traverses along a railway.

In the embodiment of FIGS. 6A-6B, the axle sleeve 586 is positioned over the axle shaft 536 and is restricted from rotating about the axle shaft 536. The rotatable arms 583a-583b of mount 513 are free to rotate about the axle shaft 536.

Because the tie 589 may cause the rotatable arms 583a-583b to abut the fixed axle sleeve 586 on the outside of the opposed ends of axle sleeve 586, the rotatable mount 513 may be free to rotate about the axle shaft 536, and the position of the rotatable mount 513 along the longitudinal length of the axle shaft 536 may be restricted.

The rail gear 500 may be attached to a vehicle via the fixed mount 509 and the rotatable mount 513. For example, the fixed mount 509 and the rotatable mount 513 may be attached directly to the frame or chassis of the vehicle. Alternatively, the fixed mount 509 and the rotatable mount 513 may be attached directly to a rail gear lift, a mount bracket, or any other type of apparatus that facilitates attaching the rail gear 500 to a vehicle.

With the rail gear 500 attached to a vehicle, the rail gear 500 may be engaged with the rails of a railway, and the vehicle may traverse along the railway with the aid of the rail gear 500. In this sense, the rail guidewheels 526a-526b may make contact with and roll along the rails of the railway by rotating about the wheel shafts 519a-519b. If the rail gear 500 traverses along a curved length of the railway, for example, the rotatable mount 513 may rotate with respect to the axle 506 so that the axle may pivot with respect to the attachment point between the vehicle and the rail gear 500. As a result, it may be more likely that the rail gear 500 traverses along the curved length of the railway without the rail guidewheels 526a-526b disengaging the rails of the railway.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, at least the following is claimed:

1. A system, comprising:
    a vehicle configured to travel along a surface; and
    rail gear that is attached to the vehicle to facilitate the vehicle traveling along a railway, the rail gear comprising:
        a first rail guidewheel and a second rail guidewheel in rotatable connection with an axle, the axle having a longitudinal axis, the first rail guidewheel and the second rail guidewheel connected at opposed ends of the axle;
        a first mount attached to the vehicle and configured to be fixed to the axle to prohibit rotation of the first mount around the longitudinal axis of the axle; and
        a second mount attached to the vehicle and configured to rotate at least partially around the longitudinal axis of the axle, wherein the first mount and the second mount are positioned between the first rail guidewheel and the second rail guidewheel.

2. The system of claim 1, wherein the second mount comprises a rotatable arm that extends between the axle and the vehicle, the rotatable arm being configured to rotate at least partially around the longitudinal axis of the axle.

3. The system of claim 1, wherein the rail gear comprises at least one insulator that electrically insulates the axle from at least one of the first rail guidewheel or the second rail guidewheel.

4. A system, comprising:
a vehicle configured to travel along a surface; and
rail gear that is attached to the vehicle to facilitate the vehicle traveling along a railway, the rail gear comprising:
- a first rail guidewheel and a second rail guidewheel in rotatable connection with an axle having a longitudinal axis;
- a first mount attached to the vehicle and positioned about the axle; and
- a second mount attached to the vehicle and configured to rotate at least partially around the longitudinal axis of the axle, wherein the second mount comprises:
  - a plurality of rotatable arms wherein each of the plurality of rotable arms extends between the axle and the vehicle and the axle extends through each of the plurality of rotable arms, each of the plurality of rotatable arms configured to rotate at least partially around the longitudinal axis of the axle; and
  - an axle sleeve positioned between a first one of the rotatable arms and a second one of the rotatable arms.

5. The system of claim 4, wherein the axle sleeve is restricted in a fixed longitudinal position relative to the axle.

6. The system of claim 4, wherein the axle sleeve is rotatable relative to the axle and wherein a plurality of collars are provided to the outside of at least two of the arms, the collars fixed to the axle and preventing lateral movement of the second mount along the axle while allowing rotation of the arms relative to the axle.

7. The system of claim 4, wherein the axle sleeve is restricted in a fixed position relative to the first one of the rotatable arms and the second one of the rotatable arms.

8. The system of claim 4, wherein both mounts are configured to rotate at least partially around the longitudinal axis of the axle.

9. An apparatus, comprising:
an axle having a longitudinal axis;
a first rail guidewheel and a second rail guidewheel in rotatable connection with the axle, the first rail guidewheel and the second rail guidewheel connected at opposed ends of the axle;
a first mount attached to the axle and configured to be fixed to the axle to prohibit rotation of the first mount the around longitudinal axis of the axle, and being configured to attach to a vehicle; and
a second mount attached to the axle and configured to attach to the vehicle, the second mount being configured to rotate at least partially around the longitudinal axis of the axle, wherein the first mount and the second mount are positioned between the first rail guidewheel and the second rail guidewheel.

10. The apparatus of claim 9, wherein the second mount comprises:
a plurality of rotatable arms that are configured to rotate at least partially around the longitudinal axis of the axle.

11. The apparatus of claim 10, wherein the second mount comprises an axle sleeve positioned between a first one of the rotatable arms and a second one of the rotatable arms.

12. The apparatus of claim 9, comprising at least one insulator that electrically insulates the axle from at least one of the first rail guidewheel or the second rail guidewheel.

13. The apparatus of claim 12, wherein the at least one insulator comprises an insulator tube that is positioned between an interior wall of the axle and a shaft for the first rail guidewheel.

14. The apparatus of claim 12, wherein the at least one insulator comprises an insulator ring that is positioned between an end of the axle and a shaft for the first rail guidewheel.

15. The apparatus of claim 12, wherein the at least one insulator comprises an insulator sleeve for a bolt that restricts movement between the axle and a shaft for the first rail guidewheel.

16. The system of claim 1, wherein the second mount comprises a rotatable arm that extends between the axle and the vehicle, and wherein the axle extends through the rotatable arm.

17. The apparatus of claim 9, wherein the second mount comprises a rotatable arm that extends between the axle and the vehicle, and wherein the axle extends through the rotatable arm.

* * * * *